United States Patent Office 3,736,159
Patented May 29, 1973

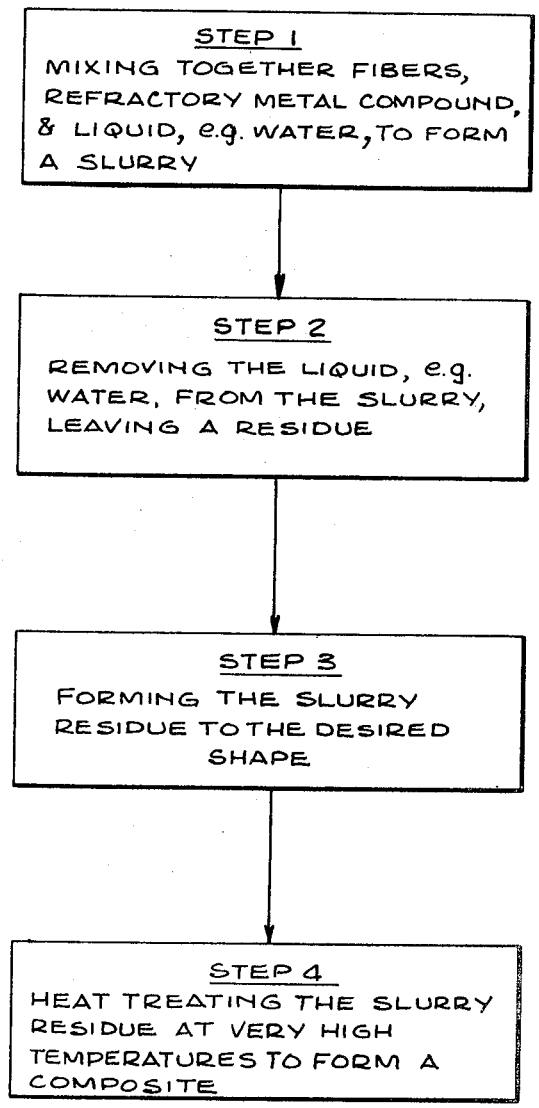

---

3,736,159
COMPOSITES HAVING LOW THERMAL EXPANSION
James O. Gibson and Robert L. Schumacher, Richland, and Kay L. Myler, Benton City, Wash., assignors to McDonnell Douglas Corporation, Santa Monica, Calif.
Filed Mar. 2, 1970, Ser. No. 15,526
Int. Cl. C04b 35/54
U.S. Cl. 106—56
22 Claims

ABSTRACT OF THE DISCLOSURE

Process wherein short lengths of fibers, e.g. graphite fibers, extremely small particles of a refractory metal compound, e.g. NbC of 0.02 micron particle size, and liquid, e.g. water, to make a slurry, are thoroughly mixed together, the liquid e.g. water is then removed from the slurry, leaving a slurry residue which can be formed to the desired shape as by pressing and finally heat treated at very high temperatures, e.g. 3000° C., to form a composite with fibres, e.g. graphite fibers, dispersed in a matrix of refractory metal compound, e.g. NbC. A composite produced by the above process.

---

This invention relates to composites and particularly to a composite having graphite fibers dispersed in a matrix of a refractory metal compound or a refractory metal compound mixture, and characterized by low thermal expansion, and to a process for making the above described composites.

It is well known that for most devices such as those operating by mechanical, electrical, chemical means and the like, the operating efficiency is directly proportional to the operating temperature. Operating temperature is in most cases, however, limited by the properties of the structural or operating members supporting the parts of such devices. Furthermore, the higher the desired operating temperature, the fewer materials there are available for structural parts which can withstand elevated temperatures. Gas turbines, thermionic emitters, and the like are examples of devices which are particularly limited by their materials of construction.

The manufacture of structural parts usually requires the joining of dissimilar materials as by brazing, gluing, and welding. Too often when the device having joined structural parts is subjected to thermal cycling, separation of the joined parts becomes a serious problem. Separation takes place when the coefficients of thermal expansion (CTE) are not closely matched. Thus, it is most desirable to be able to specify and obtain CTE values for structural members which are to be used in high temperature devices. High strength of the structural member is also desirably maintained at the same time.

At temperatures above 2200° C. graphite and certain graphite composites are the only materials available which are generally considered to exhibit sufficient strength and long term dimensional stability for use in devices operating at elevated temperatures. As a result, graphite and certain graphite composites are widely used in structural members.

In certain types of engines using hydrogen gas as the working fluid, graphite and in some cases graphite composites have failed catastrophically. The reason is that above 600° C. hydrogen reacts chemically with carbon or graphite at an extremely rapid rate, forming volatile hydrocarbons.

Problems such as those above described have stimulated extensive research directed to the development of a satisfactory structural material having the following properties, (1) resistance to hydrogen, and other types of chemical corrosion; (2) low compressive creep at operating temperatures, and most desirably below about 4%, (3) high strength, e.g. preferably having a room temperature flexural strength above 10,000 p.s.i.; and finally (4) a low coefficient of thermal expansion, e.g. of the order of about (5.0) (10⁻⁶) in./in.° C.

It was found in the course of research that most metal carbides including niobium carbide, are relatively stable in flowing hydrogen up to their melting points e.g. NbC–3500° C. Composites of graphite and NbC which have been developed have proved unsatisfactory mainly because of failure to meet the criteria for compressive creep strength and also thermal stress resistance, the latter property being primarily dependent on obtaining low values for the linear coefficient of thermal expansion (CTE). These composites are made conventionally by mechanically blending calcined petroleum coke (an acicular or needle coke) having a particle size of 44 to 250 microns in size with niobium carbide particles of about 6 micron size. The blended powders are then hot pressed to achieve a high density billet.

Graphite composites produced according to the method disclosed in the copending application of James O. Gibson, Robert L. Schumacher, and Kay L. Myler, Ser. No. 15,525, filed of even date herewith, exhibit very low coefficient of thermal expansion, good resistance to hydrogen and other types of chemical corrosion. The composites of the above copending application can be produced by coating or impregnating graphite fibers, e.g. graphite fibers, with a composition comprising a refractory metal compound of extremely small particle size, e.g. NbC of 0.02 micron diameter particle size, and a binder, e.g. polymerizable furfuryl alcohol and maleic anhydride, forming the coated fibers to a desired shape, and heating the formed coated fibers at high temperatures in the range of from about 40% to about 98% of the melting point of the refractory metal compound.

Although the invention of the above copending application produces compositions having somewhat lower coefficient of thermal expansion with respect to the composites of the present invention, the process of the present invention is somewhat simpler and more economical, and produces composites having otherwise comparable advantageous properties. Also, the composites produced by the two respective processes can have different applications.

It has now been unexpectedly discovered that the above disadvantages of graphite and composites containing graphite are substantially completely eliminated by the process of the present invention. The superior graphite composites of the invention are produced by mixing together fibers, e.g. graphite fibers, a refractory metal compound, e.g. NbC, of a particle size not larger than about 0.6 micron, in amounts to give a ratio of fibers to refractory metal compound ranging from about 1% of fibers and about 99% of refractory metal compound, to about 90% of fibers and about 10% of refractory metal compound, by volume, and sufficient liquid e.g. water, to form a substantially homogeneous slurry. Liquid, e.g. water, from the slurry is then removed, as by filtration followed by drying of the residue in an oven. The residue is then formed to a desired shape, for example by pressing, and finally heated to a temperature in the range of from about 40% to about 98% of the melting point of the refractory metal compound, e.g. 3150° C. for NbC. There is thus produced a composite having graphite fibers dispersed in a matrix of refractory metal compound, e.g. NbC.

Composites produced by the method of the invention are significantly superior to prior art composites, exhibiting lower coefficients of expansion, greater resistance to thermal shock, low compressive creep at operating temperature and times when used for structural parts, and have of the order of 2½ times the flexural strength. At the same time the composites of the invention exhibit good resistance to hydrogen and other chemical corrosion.

The use of submicron sized refractory metal particles permits better bonding of the particles to the fibers than is possible using larger sized particles. Furthermore, the submicron particle size also permits the employment of lower processing temperatures than are possible if larger sized particles e.g. 44 micron, are used.

In addition, the microstructure of the composite produced by the process of the invention is new and unique having an extremely fine dispersion of graphite fiber in a matrix of refractory metal compound.

The invention will be more easily understood by reference to the description below of certain preferred embodiments of the invention taken in connection with the accompanying drawing which is a flow diagram of the process of the invention.

Referring now to the drawing, in step 1, fibers refractory metal compound, and liquid, e.g. water, are mixed together to form a slurry. The liquid, e.g. water, is then removed from the slurry in step 2, leaving a residue, which can be formed in step 3 to the desired shape. Finally, the slurry residue is heat treated at very high temperatures in step 4 to form a composite.

Thus, the invention comprises a process for dispersing fibers in a refractory metal compound phase comprising mixing to a substantially homogeneous state fibers, e.g. graphite fibers, preferably having a length less than about 2 inches, with a refractory metal compound of particle size which is less than about 0.6 micron in amounts to give a ratio of fibers to refractory metal compound of from about 1% to about 90% of fibers and about 10% to about 99% refractory metal compound by volume, and sufficient liquid, e.g. water, to form a slurry, the liquid e.g. water, is then removed from the slurry leaving a slurry residue which can be formed into the desired shape, and which is heated to a temperature in the range of from about 40% to about 98% of the melting point of the refractory metal compound. Forming and heat treating of the fibers can be achieved simultaneously by hot pressing. There is formed by the above process a dispersion of fibers in a matrix of refractory metal compound.

The fibers which can be used in the process according to the invention include amorphous carbon fibers, pyrolytic graphite fibers, graphite fibers, natural organic fibers, synthetic organic polymer fibers, inorganic fibers, and mixtures thereof. The natural fibers include animal fibers such as silk and wool, and vegetable fibers such as those derived from seed hairs as cotton and kapok, those derived from leaves producing hard fibers such as henequen, sisal and istle, and those derived from stems producing soft or bast fibers such as flax, hemp, jute, kenaf, and ramie. The synthetic organic polymer fibers which can be used include among others those such as acetate, acrylic azlon, modacrylic, nylon, olefin, polyester, rayon, rubber, saran, spandex, triacetate, vinal, and vinyon. The inorganic fibers include among others BN, B, and $SiO_2$ fibers.

Of the above mentioned fibers, the amorphous carbon fibers, pyrolytic graphite fibers and graphite fibers are the most preferred for their strength and heat resistance.

When the natural and synthetic fibers mentioned above are employed the carbon contained therein undergoes carbonization beginning at temperatures of about 300° C. in a vacuum when the fibers would start losing hydrogen and breaking organic bonds. When temperatures of about 2000° C. have been reached, carbonization of most organic fibers is about 98% complete. At a temperature of about 2500° C. most carbon containing fibers undergo almost complete graphitization as distinguished from carbonization in a few minutes. Graphitization takes place at even more rapid rates as the temperature is increased above 2500° C.

Even if final heat treatment were below complete graphitization temperatures, synthetic fibers would be desirable since carbon fibers are strong and useful. In certain instances, for example when low thermal conductivity is desired, carbon fibers could be more desirable than graphite fibers.

The fibers employed can have a length which is less than about 2 inches and down to extemely short lengths, for example 0.00024 inch (6.15 microns). Preferably fiber lengths are in the range of from about 0.0025 inch (64.1 microns) to about 0.35 inch (8974 microns). Discontinuous fiber lengths can also be used.

Preferably, the fibers have a diameter in the range of from about 0.125" (inch) to about .000026" and most desirably in the range of from about 2 microns to about 15 microns. Also it is preferred to employ fibers having a length to diameter ratio ranging from about 1/1 to about 140/1 and most preferably from about 10/1 to 1/1.

As noted previously, the short lengths of fibers are mixed with very small particles of a refractory metal compound and sufficient liquid such as water to produce a slurry.

Refractory metal compounds which can be employed in the process of the invention are many. Examples of suitable compounds are as follows: the carbides, borides, silicides, nitrides, phosphides, sulfides, and oxides of niobium, tantalum, zirconium, titanium, vanadium, molybdenum, hafnium, tungsten, rhenium, uranium, thorium, plutonium, promethium, boron, silicon, and mixtures thereof. It is of course not preferred to employ any specific compounds within the above described classes of compounds which are not sufficiently stable at high temperatures and/or which do not form high melting compounds. Specific examples of such refractory metal compounds are set forth in the working examples hereinafter.

Of the above mentioned compounds, the carbides and borides are most preferred, and particularly niobium carbide.

When the refractory metal compound comprises the metal oxides above mentioned in conjunction with graphite or carbon fibers, the graphite or carbon fibers should be protected with a thin film of a material such as $WSi_2$ and/or processing and application temperatures should be kept below about 1200° C. Thus, oxides which can be employed include $ThO_2$, $UO_2$, $ZrO_2$, $TiO_2$, $HfO_2$, $Pm_2O_3$ and $PuO_2$. Although composites produced from the metal oxides are not generally useful at very high temperatures, these composites are still desirable because of their high strength and low CTE properties.

By the term "refractory metal compound," is meant to include those compounds mentioned above and in this disclosure as well as other high heat resistant materials including mixtures of the above materials, alloys and the like.

A particularly preferred system utilizing mixtures of the above mentioned materials is the $HfB_2$-$WSi_2$-SiC system as the ceramic phase as 20% to 80% by volume with about 80% to about 20% by volume graphite fiber. In such refractory compound mixture, the proportions of $HfB_2$, $WSi_2$ and SiC can vary. A preferred refractory metal compound mixture of the above type contains proportions of about 66 parts of $HfB_2$, 10 parts of $WSi_2$ and 10 parts SiC, by weight. Such mixture in a preferred composition can be employed with about 14 parts by weight of graphite fibers. The above system provides extraordinary oxidation resistance and excellent thermal shock properties when incorporated in graphite composites.

In general, the smaller the particle size of the refractory metal compound the better. Preferably the particles are of a size not larger than about 0.6 micron, and usually are in the range of from about 0.0004 micron to about 0.6000 microns. Most desirably the particle size for the refractory metal compound is one which is approximately 1/10 the diameter of the fiber or smaller. As an example, if graphite fibers to be used have a diameter of 6.6 microns, then the particles of refractory metal compound are about 0.6 micron in size or smaller. The ratio of particle size to fiber diameter facilitates diffusion of the particles in and around the fiber interstices.

Water or other inert liquid is added to the fibers and refractory metal compound particles in an amount sufficient to produce a slurry. Usually this amount is about 30% to about 80% of liquid and about 20% to about 70% of fiber and refractory metal compound mixture, by weight.

The liquid which is to be added to the fibers and refractory metal compound can be any liquid which is substantially inert to the fibers and to the refractory metal compound. Thus, water, methyl alcohol, ethyl alcohol, and other alcohols, benzene, petroleum ether, kerosene, xylene, and similar liquids can be used. Water is most preferred because of its economy, non-polluting aspects when evaporated, and its availability. However, other liquids, especially those with low boiling points can be employed when more rapid evaporation is desired.

The slurry produced from the liquid, fibers and refractory metal compound particles is thoroughly mixed until a substantially homogeneous state is reached.

Mixing can be done in any suitable manner. For example, a propeller type stirrer can be used, as can a high speed rotary mixer. When the high speed rotary mixer is used the fibers can be introduced in the form of short pieces of fiber yarn for example about 1 inch to about 6 microns in length. The mixer separates the yarn into its fibers and chops it into lengths between $\frac{1}{16}$ and $\frac{1}{32}$ inch for the above 1 inch yarn length.

Using the high speed rotary mixer, a substantially homogeneous mixture is reached after about 30 minutes or less of mixing.

When the slurry has been mixed to a substantially homogeneous state, the liquid is removed from the slurry. This can be achieved by any suitable means. For example evaporation can be employed. A preferred simple means of removing the water consists of filtering the slurry to remove a major part of the water and then drying the slurry residue in an oven for example at about 125° C. to remove the remaining liquid. Other methods for removing the liquid from the slurry include vacuum evaporation, solvent extraction and filtration with volatile solvent, and the like.

The substantially dry slurry residue can then be consolidated, that is shaped or formed, to produce a composite of the desired dimensions by any one of many methods. Examples of suitable methods to consolidate the slurry residue to form a composite include among others vacuum hot pressing, high-energy rate forming, hot isostatic pressing, explosive compaction, extrusion, hot rolling, and hot swaging. In general, pressures employed can range from about 2000 p.s.i. to about 500,000 p.s.i., depending on the method employed. In vacuum hot pressing, pressures of about 3000 p.s.i. to about 20,000 p.s.i. can normally be used.

The final step of heat treating the composite can be performed separately from the compaction or forming step or can be performed simultaneously as in vacuum hot pressing. The temperature at which heat treatment is conducted can be in the range of from about 40% to about 98%, preferably about 50% to about 98%, of the specific melting point of the refractory metal compound or refractory metal compound mixture. Time of heat treatment can vary depending upon factors such as the particular refractory metal compound employed, temperature, and for example billet size. For example, heat treating time can range from about 10 to about 20 minutes.

In a modification of the above described process, short 0.1 to about 1 inch lengths of fibers or yarn coated according to the method described in our above copending application Ser. No. 15,525 can be added to the slurry of fibers and refractory metal compound. The amounts of such additions can range from about 1 volume percent to about 90 volume percent based on the total slurry solids.

The coated yarn or fibers described above are produced by coating or impregnating fibers as defined above with an impregnating composition comprised of refractory metal compound as defined above and sufficient binder, e.g. a thermosetting polymer or thermosetting pre-polymers, to form a slurry. The impregnated coating on the fibers is permitted to harden or polymerize. This step can be hastened by exposure to heat. Examples of thermosetting polymers and pre-polymers which can be employed include among others phenolic resins, alkyds, epoxies, silicones, amino resins, e.g. urea-aldehyde, melamine-aldehyde and polyurethane resins, furan resins including homopolymers of furfuryl alcohol, copolymers of furfural, and mixtures of these polymers.

After the additions of coated fiber or yarn are made to the slurry, the process is otherwise the same as described above. Thus, the slurry is mixed to a homogeneous state, liquid removed, the slurry residue consolidated or formed into a composite, and the composite heat treated at high temperatures.

The composite produced by the above modified method of the invention is characterized by low coefficient of thermal expansion and superior strength in the against-the-grain direction.

The following examples are given for the purpose of illustrating the invention and are not to be construed as a limitation thereof.

EXAMPLE 1

A high speed rotary mixer is charged with 63 parts by volume graphite yarn 2 inches or less in length and 37 parts by volume NbC of 0.02 micron particle size. A typical graphite yarn (Thornel 25) has the following properties:

| | |
|---|---|
| Plies/yarn | 2. |
| Filament/ply | 720. |
| Twist-ply/ply | 1.6. |
| Yarn diameter | About 0.02 inch. |
| Yield | 5600 yd./lb. |
| Breaking strength | About 8 lb. |

A typical fiber of which the graphite yarn is composed has the following properties:

| | |
|---|---|
| Modulus | $25 \times 10^6$ p.s.i. |
| Specific modulus | $490 \times 10^6$ in. |
| Strength | $180 \times 10^3$ p.s.i. |
| Specific strength | $3.5 \times 10^6$ in. |
| Density | 1.42 g./cm.$^3$ or 0.051 lb./in.$^3$. |
| Diameter | 7.4 microns or 0.00029 in. |

Sufficient water is then added to the niobium carbide-fiber mixtures to form a thick slurry, using about 50 parts of water per 50 parts of total solids, by weight. Mixing of the ingredients is begun and continued for 30 minutes at high speed. At the end of this time, the slurry is substantially homogeneous. The slurry is then filtered through a Buchner funnel to remove a majority of the water. The slurry residue in the form of a cake is dried in a 125° C. oven for 2 hours. The dry slurry residue is then placed in a vacuum hot press die case and hot pressed at 3150° C. and at a pressure of 3000 p.s.i. to form a billet or composite. The billet is composed of 63 volume percent graphite fiber and 37 volume percent niobium carbide particles. The microstructure of the billet when examined at high magnifications (1000×) shows a new and unique type of microstructure previously unknown to this art.

The properties of the composite or billet are given in Table I.

TABLE I

| Property | Units | Values |
|---|---|---|
| Linear coefficient of thermal expansion, 0° to 2,500° C. | (10)⁻⁶ in./in./° C. | 5.0. |
| Compressive creep at operating temp. and times. | Percent | <0.1. |
| Flexural strength at 20° C | P.s.i | 20,000. |
| Carbide particle size | | Very fine. |
| Hydrogen corrosion resistance | | Satisfactory. |

EXAMPLE 1a

For purposes of comparison but not in accordance with the invention, a conventional type of composite is made by blending 35 parts by weight calcined petroleum coke of an acicular or needle coke type having a particle size of 44 to 250 microns with 65 parts by weight niobium carbide particles of about 6 micron size. The blended powders are hot pressed at 3150° C. and 3000 p.s.i. forming a high density billet. The properties of the composite or billet are given below in Table II.

TABLE II

| Property | Units | Prior art values |
|---|---|---|
| Linear coefficient of thermal expansion, 0° to 2,500° C. | (10)⁻⁶ in./in./° C. | 7.0 to 9.0. |
| Compressive creep at operating temp. and times. | Percent | 3.0 to 8. |
| Flexural strength at 20° C | P.s.i | 8,000 to 13,000. |
| Carbide particle size | | Coarse. |
| Hydrogen corrosion resistance | | Satisfactory. |

It is readily apparent from Table I and Table II that the composite billet produced by Example 1, the method of the invention, is superior to that of the prior art method of Example 1a. The invention composite is characterized by a lower coefficient of expansion 5.0, as opposed to 7.0–9.0 for the prior art composite, low compressive creep as opposed to 3.0% to 8% for the prior art composite, as much as 2½ times the flexural strength at 20° C. i.e. 20,000 p.s.i. as opposed to 8,000 to 13,000 for the prior art composite, and finer carbide particle size. Furthermore, the microstructure is unique to the invention composite.

EXAMPLE 2

Substantially the procedure of Example 1 is repeated except that $TaSi_2$ of 0.02 micron particle size is substituted for the NbC, and nylon fibers of 20 micron diameter is used in place of the graphite fibers. The slurry residue is hot pressed at 2315° C. and 3000 p.s.i. The composite billet is found to possess properties comparable to that of Example 1.

EXAMPLE 3

Substantially the procedure of Example 1 is repeated except that $WB_2$ of 0.6 micron particle size is employed in place of the NbC; woolen yarn of 0.5 in. lengths and 100 micron diameter is employed in place of the graphite yarn; and methyl alcohol is used in place of water. The slurry residue is hot pressed at a temperature of 2825° C. and a pressure of 5000 p.s.i. to form a billet. The billet is found to have properties comparable to that of the billet formed in Example 1.

EXAMPLE 4

A high speed rotary mixer is charged with 45 parts by volume $ThO_2$ of 0.55 micron particle size and 55 parts by volume short 0.1 inch lengths of rayon fibers of 20 micron diameter. Water is added in sufficient amount to give a thick slurry. The mixer is started and run at high speed for about 40 minutes at which time the slurry is in a substantially homogeneous state. The slurry is then filtered through a Buchner funnel to remove most of the water. The remaining water is removed by drying of the cake at 125° C. for 2 hours. At the end of this time the slurry residue is vacuum hot pressed to form a billet at 1200° C. and 8000 p.s.i. The billet is found to have properties comparable to that of Example 1.

EXAMPLE 5

Substantially the procedure of Example 4 is repeated using 35 parts by volume TiN of 0.04 micron particle size in place of the $ThO_2$ and 65 parts by volume cotton fibers of ⅟₁₆ inch length and 85 micron size in place of the rayon fibers. The dry slurry residue is vacuum hot pressed to form a billet at 2800° C. and 3000 p.s.i. The billet is found to possess low coefficient of thermal expansion values and other properties comparable to the billet of Example 1.

EXAMPLE 6

Substantially the procedure of Example 1 is repeated using 50 parts by volume $TaS_2$ of 0.02 micron particle size in place of the NbC, and 50 parts by volume pyrolytic graphite fibers of 1 in. length and 15 micron diameter are used in place of the graphite fibers. The dry slurry is hot pressed at 2000° C. and 4500 p.s.i. to form a billet. The billet is found to possess properties comparable to the billet of Example 1.

EXAMPLE 7

Substantially the procedure of Example 1 is repeated using 45 parts by weight $HfB_2$ of 0.03 micron particle size and 55 parts by weight graphite yarn having the properties described in Example 1. Kerosene is also used in place of the water and evaporated at ambient temperatures. A billet is formed from the dry slurry residue by hot pressing at 3000° C. and 8000 p.s.i. The billet is found to possess low CTE and other properties comparable to the billet of Example 1.

EXAMPLE 8

Substantially the procedure of Example 1 is repeated employing 30 parts by volume $B_4C$ of 0.1 micron particle size in place of the NbC, and 70 parts by volume graphite fibers of 12 micron diameter and 0.4 in. length. The dried slurry residue is placed in a die and hot pressed to form a billet at a temperature of 2200° C. and a pressure of 10,000 p.s.i. The properties of the billet are found to be comparable to that of the billet produced by Example 1.

EXAMPLE 9

Substantially the procedure of Example 1 is repeated using 15 parts by volume BN of 0.04 micron particle size and 20 parts by volume $W_2C$ of 0.04 micron particle size in place of the NbC, and 65 parts by volume amorphous carbon fibers having a diameter of 7 microns and a length of about 0.5 inch. The dry slurry residue is hot pressed at a temperature of 2775° C. and a pressure of 3000 p.s.i. to form a billet. The billet is found to possess properties comparable to that of Example 1.

EXAMPLE 10

Substantially the procedure of Example 4 is repeated using 33 parts by volume $ZrO_2$ of 0.02 micron particle size in place of the $ThO_2$, and 67 parts by volume acetate fibers of 0.5 in. length and 10 microns in diameter in place of the rayon fibers. The dry slurry is hot pressed at 1200° C. and a pressure of 8000 p.s.i. to form a billet. The billet is found to possess properties comparable to that of Example 4.

EXAMPLE 11

Substantially the procedure of Example 1 is repeated using 35 parts by volume of HfC of 0.05 micron particle size in place of the NbC, and 65 parts by weight graphite yarn having the properties described in Example 1. The dry slurry is hot pressed at 3500° C. and 3000 p.s.i. to form a billet. The composite billet is found to have properties comparable to that of Example 1.

EXAMPLE 12

Substantially the procedure of Example 1 is repeated with 25 parts by weight $TiB_2$ of 0.04 micron particle size in place of the NbC, and 75 parts by weight graphite fiber of the properties described in Example 1. The slurry residue is permitted to dry at ambient temperatures for 2 hours instead of in an oven. The dry slurry residue is formed by hot swaging at 2800° C. The formed piece is found to possess properties comparable to the composite of Example 1.

EXAMPLE 13

Substantially the procedure of Example 1 is repeated using 10 parts by volume $HfB_2$ of 0.02 micron particle size, 10 parts by volume $WSi_2$ of 0.02 micron particle size, and 10 parts by volume SiC of 0.02 micron particle size in place of the NbC, and 70 parts by weight graphite fiber having the properties described in Example 1. The dry slurry residue is hot pressed at 2000° C. and pressures of 5,000 p.s.i. to form a billet. The billet is found to possess properties comparable to that of Example 1. In addition, the composite possesses superior oxidation resistance and thermal shock properties.

EXAMPLE 14

Substantially the procedure of Example 1 is repeated using the same amounts and ingredients and in addition 50 parts by weight graphite yarn of 0.375 in. length coated in the following manner.

An impregnating composition is prepared by intimately mixing together the following ingredients:

| | Parts by weight |
|---|---|
| Maleic anhydride | 8.2 |
| Niobium carbide of 0.02 micron particle size | 29.5 |
| Niobium metal of 5 micron particle size | 3.3 |
| Varcum binder available from the Varlacoid Chemical Co. and understood to comprise mainly furfuryl alcohol resin | 59.0 |

The above composition is characterized by high viscosity. Graphite yarn having properties similar to that described in Example 1 is then drawn continuously through the above composition effecting a coating thereon. The yarn emerging from the high viscosity slurry is uniformly covered with a coating of the slurry. The coated yarn is then dried by exposure to hot air at a temperature of about 200° C. The hot air causes the coating to thermally set or harden on the yarn to form a strong adherent coating of the NbC particles on the yarn and fibers. The coated yarn is then chopped into pieces about 0.375 in. long.

The short pieces of coated yarn are added to a low speed jar mill along with the uncoated graphite fibers and NbC particles. In other respects the billet is formed in the same manner as described in Example 1.

The composite billet is found to possess properties comparable to that of Example 1. In addition, the composite is found to possess superior strength in the against-grain direction, and a lower coefficient of thermal expansion.

Various modifications will be apparent to those skilled in the art and can be resorted to without departing from the spirit and scope of the invention, and hence the invention is not to be taken as limited except as defined by the following claims.

We claim:

1. Process for producing a composite having low thermal expansion and high flexural strength comprising; mixing to a substantially homogeneous state (a) fibers selected from the group consisting of graphite fibers, pyrolytic graphite fibers, and amorphous carbon fibers, and mixtures thereof, (b) refractory metal compound of particle size not larger than about 0.6 micron in amounts to give a ratio of fibers to refractory metal compound ranging from about 1% of fibers and about 99% of refractory metal compound, to about 90% of fibers and about 10% of refractory metal compound, by volume, said refractory metal compound being selected from the group consisting of the carbides, borides and silicides, of niobium, tantalum, zirconium, titanium, vanadium, molybdenum, hafnium, tungsten, rhenium, uranium, thorium, plutonium, promethium, boron, silicon, and mixtures thereof, and (c) sufficient inert liquid to form a slurry; removing the liquid from the slurry; forming the slurry residue to the desired shape; and heating the slurry residue to a temperature in the range of from about 40% to about 98% of the melting point of the refractory metal compound, thereby producing a composite comprising a dispersion of said fibers in a matrix of said refractory metal compound.

2. The process of claim 1, said heating of said slurry residue being carried out to a temperature in the range of about 50% to about 98% of the melting point of the refractory metal compound.

3. The process of claim 1, wherein said fibers have a diameter in the range of from about 0.125″ to about 0.000026″.

4. The process of claim 1, wherein said fibers have a diameter in the range of from about 2 microns to about 15 microns.

5. The process of claim 4, wherein the particle size of said refractory metal compound is in the range of from about 0.0004 to about 0.6000 micron.

6. The process of claim 5, wherein the particle size of said refractory metal compound is less than about $\frac{1}{10}$ the diameter of the fiber.

7. The process of claim 2, wherein said fibers are graphite fibers.

8. The process of claim 7, wherein said refractory metal compound is niobium carbide having a particle size in the range of from about 0.0004 micron to about 0.6 micron, said graphite fiber has a diameter in the range of from about 2 microns to about 15 microns, and the particle size of NbC is less than about $\frac{1}{10}$ the diameter of the fiber.

9. The process of claim 7, wherein said refractory metal compound comprises $HfB_2$, $WSi_2$, SiC; said graphite fibers and said refractory metal compound mixture being present in the following proportions by weight: 66% $HfB_2$, 10% $WSi_2$, 10% SiC and 14% graphite fiber.

10. The process of claim 1, wherein said refractory metal compound comprises the carbides of niobium, tantalum, zirconium, titanium, vanadium, molybdenum, hafnium, tungsten, rhenium, uranium, thorium, plutonium, promethium, boron, silicon, and mixtures thereof.

11. The process of claim 7, wherein said refractory metal compound is niobium carbide.

12. The process of claim 1, wherein the liquid is removed from the slurry by filtering and then drying the slurry residue at temperatures below about 200° C.

13. The process of claim 1, wherein said forming comprises vacuum hot pressing.

14. The process of claim 1, wherein said heat treatment is conducted at a temperature which is at least as high as that temperature at which graphitization takes place.

15. A process according to claim 1, wherein said inert liquid is selected from the group consisting of water, alcohols, benzene, petroleum ether, kerosene and xylene.

16. A process according to claim 1, wherein said inert liquid is water.

17. The process of claim 1, wherein there is added to said slurry about 1 volume percent to about 90 volume percent based on slurry solids, of said fibers, said latter fibers being coated with a composition comprising (a) said refractory metal compound in the form of particles of a size which is less than about 0.6 micron and (b) a binder selected from the group consisting of thermosetting polymers and thermosetting pre-polymers.

18. A process as in claim 3 wherein the fibers have a length and diameter ratio ranging from about 1/1 to about 140/1.

19. The process of claim 9, wherein said refractory metal compound has a particle size in the range of from about 0.0004 micron to about 0.6 micron, said graphite fiber has a diameter in the range of from about 2 microns to about 15 microns, and the particle size of said refractory metal compound is less than about 1/10 the diameter of the fiber, said ratio of fibers to refractory metal compound ranging from about 55% of fibers and about 45% of refractory metal compound, to about 75% of fibers and about 25% of refractory metal compound, by volume.

20. An article in the form of a composite having a low coefficient of thermal expansion, low compressive creep and high flexural strength, said composite comprising a dispersion of fibers selected from the group consisting of graphite fibers, pyrolytic graphite fibers, and amorphous carbon fibers, in a matrix of refractory metal compound selected from the group consisting of the carbides, borides and silicides, of niobium, tantalum, zirconium, titanium, vanadium, molybdenum, hafnium, tungsten, rhenium, uranium, thorium, plutonium, promethium, boron, silicon, and mixtures thereof, produced by the process of claim 1.

21. An article in the form of a composite having a low coefficient of thermal expansion, low compressive creep and high flexural strength, said composite comprising a dispersion of graphite fibers in a matrix of refractory metal compound selected from the group consisting of the carbides, borides and silicides, of niobium, tantalum, zirconium, titanium, vanadium, molybdenum, hafnium, tungsten, rhenium, uranium, thorium, plutonium, promethium, boron, silicon, and mixtures thereof, produced by the process of claim 9.

22. An article in the form of a composite having a low coefficient of thermal expansion, low compressive creep and high flexural strength, said composite comprising a dispersion of graphite fibers in a matrix of niobium carbide, produced by the process of claim 10.

References Cited

UNITED STATES PATENTS

| | | | |
|---|---|---|---|
| 3,400,181 | 9/1968 | Battista et al. | 106—56 X |
| 3,470,003 | 9/1969 | Waylett | 106—56 |
| 2,811,457 | 10/1957 | Speil et al. | 252—62 X |
| 3,231,401 | 1/1966 | Price et al. | 106—69 |
| 3,429,722 | 2/1969 | Economy et al. | 106—55 |
| 3,249,568 | 5/1966 | Reis | 252—62 X |
| 3,514,403 | 5/1970 | Muendel | 252—62 |

FOREIGN PATENTS

| | | | |
|---|---|---|---|
| 986,179 | 3/1965 | Great Britain | 106—56 |

DANIEL J. FRITSCH, Primary Examiner

U.S. Cl. X.R.

106—57, 65, 69; 161—170; 264—29, 86, 87, 90